(12) United States Patent
Liu (10) Patent No.: US 9,055,485 B2
(45) Date of Patent: Jun. 9, 2015

(54) OPERATING METHOD OF WIRELESS ACCESS POINT DEVICE AND WIRELESS ACCESS POINT DEVICE

(75) Inventor: Shui Liu, Shenzhen (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 158 days.

(21) Appl. No.: 13/458,413

(22) Filed: Apr. 27, 2012

(65) Prior Publication Data

US 2012/0213156 A1  Aug. 23, 2012

Related U.S. Application Data

(63) Continuation of application No. PCT/CN2010/078164, filed on Oct. 27, 2010.

(30) Foreign Application Priority Data

Oct. 28, 2009 (CN) .......................... 2009 1 0208507

(51) Int. Cl.
*H04W 28/20* (2009.01)
*H04W 52/02* (2009.01)
*H04W 28/22* (2009.01)
*H04W 52/04* (2009.01)
*H04L 1/00* (2006.01)
(Continued)

(52) U.S. Cl.
CPC .............. *H04W 28/22* (2013.01); *H04W 52/02* (2013.01); *H04W 52/0206* (2013.01); *H04W 52/04* (2013.01); *H04W 52/322* (2013.01); *Y02B 60/50* (2013.01); *H04L 1/0002* (2013.01); *H04W 28/02* (2013.01)

(58) Field of Classification Search
None
See application file for complete search history.

(56) References Cited

U.S. PATENT DOCUMENTS 6,850,539 B1   2/2005 Cassiers et al.
2005/0213532 A1   9/2005 Liu et al.
(Continued)

FOREIGN PATENT DOCUMENTS

CN   1249585 A   4/2000
CN   1411258 A   4/2003
(Continued)

OTHER PUBLICATIONS

Extended European Search Report issued in corresponding European Patent Application No. 10826088.6, mailed Oct. 8, 2012.
(Continued)

*Primary Examiner* — Marcus R Smith
(74) *Attorney, Agent, or Firm* — Brinks Gilson & Lione (57) ABSTRACT

In the field of communications technologies, an operating method of a wireless Access Point (AP) device and the wireless AP device are provided according to the embodiments of the present invention, to decrease the power consumption and prolong the operating time when a battery is used for power supply. One method includes: in the absence of data connection, after transmitting N broadcast frame signals with full power, transmitting M broadcast frame signals with low power. Another method includes: in the presence of data connection, establishing a connection with a lowest one of all compatible transmission rates; judging whether a current transmission rate is greater than or equal to a sum of a current actual throughput and a preset system parameter; and if the current transmission rate is smaller than the sum of the current actual throughput and the preset system parameter, increasing the transmission rate.

6 Claims, 8 Drawing Sheets

(51) Int. Cl.
*H04W 52/32* (2009.01)
*H04W 28/02* (2009.01)

(56) References Cited

U.S. PATENT DOCUMENTS

| | | |
|---|---|---|
| 2009/0232042 A1 | 9/2009 | Kneckt et al. |
| 2010/0041408 A1* | 2/2010 | Caire et al. ............... 455/446 |
| 2010/0128645 A1* | 5/2010 | Lin et al. .................. 370/311 |
| 2010/0138549 A1* | 6/2010 | Goel et al. ................ 709/228 |
| 2010/0233975 A1* | 9/2010 | Wu et al. .................. 455/115.1 |
| 2010/0246459 A1 | 9/2010 | Ding et al. |
| 2010/0255871 A1* | 10/2010 | Chin et al. ................ 455/522 |
| 2010/0279686 A1* | 11/2010 | Tokgoz et al. ............ 455/435.1 |
| 2012/0176998 A1* | 7/2012 | Muellner et al. .......... 370/329 |

FOREIGN PATENT DOCUMENTS

| | | |
|---|---|---|
| CN | 1533200 A | 9/2004 |
| CN | 1684441 A | 10/2005 |
| CN | 101079643 A | 11/2007 |
| CN | 101365171 A | 2/2009 |
| CN | 101541042 A | 9/2009 |
| CN | 101742708 A | 6/2010 |
| EP | 1587221 A2 | 10/2005 |
| EP | 1852982 A1 | 11/2007 |
| KR | 20080052142 A | 6/2008 |
| WO | WO 2009112633 A1 | 9/2009 |
| WO | WO 2010078476 A1 | 7/2010 |

OTHER PUBLICATIONS

Chinese Patent No. 101742708, issued on Jan. 30, 2013, granted in corresponding Chinese Patent Application No. 200910208507.5.
Office Action issued in corresponding Chinese Patent Application No. 200910208507.5, mailed Jun. 14, 2012.
Office Action issued in corresponding Chinese Patent Application No. 200910208507.5, mailed Aug. 23, 2011.
International Search Report issued in corresponding PCT Patent Application No. PCT/CN2010/078164, mailed Feb. 3, 2011.

* cited by examiner

In the absence of data connection, after transmitting N broadcast frame signals with full power, transmit M broadcast frame signals with low power, where M is an integer greater than 0, N is an integer greater than 1 or N is an integer greater than 0, and a sum of M and N remains unchanged in a certain time span ⟵ S101

OPERATING METHOD OF WIRELESS ACCESS POINT DEVICE AND WIRELESS ACCESS POINT DEVICE

CROSS-REFERENCE TO RELATED APPLICATIONS

This application is a continuation of International Application PCT/CN2010/078164, filed on Oct. 27, 2010, which claims priority to Chinese Patent Application No. 200910208507.5, filed on Oct. 28, 2009, both of which are hereby incorporated by reference in their entireties.

FIELD OF THE INVENTION

The present invention relates to the field of communications technologies, and in particular, to an operating method of a wireless Access Point device and the wireless AP device.

BACKGROUND OF THE INVENTION

The Wireless Local Area Network has an increasingly higher popularity because the networking is flexible and convenient. The Wireless Local Area Network is usually formed by two parts of devices: a wireless Access Point (Access Point, AP) and a station (Station). The downlink of the wireless AP is responsible for coverage of wireless access signals in a certain range. Various terminals, such as a computer and a mobile phone, in the range may be connected to the wireless AP through the station and access the network.

In order to provide adequate bandwidth, the uplink of the existing wireless AP accesses the Internet through the Ethernet or optical fibers. However, with the improvement of wireless technologies, such as 3G ($3^{rd}$ Generation, $3^{rd}$ mobile telecommunication) and WiMax (Worldwide Interoperability for Microwave Access, Worldwide Interoperability for Microwave Access), a wireless AP in a wireless communication format, such as HSPA (High Speed Packet Access, High Speed Packet Access) or WiMax, in the uplink has been adopted to replace the conventional wireless AP that accesses the Internet through the Ethernet and optical fibers in the uplink.

In this manner, the mobility and portability of a wireless AP is greatly improved. It is required that a new generation of mobile wireless AP can work normally outdoors without external power; therefore, using a battery for power supply is an inevitable trend.

In the implementation of using the battery for power supply for the wireless AP, the inventor finds that the prior art has at least the following problems.

As a wireless AP, signals are transmitted in two states, namely, an idle state in the absence of data transmission and a connection state in the presence of data transmission. In the idle state, the AP needs to periodically transmit a broadcast frame signal, so that peripheral stations may obtain information of the AP at any time, and then access the network through the AP; while in the connection state, the existing wireless APs are all at a high transmission rate, and the higher transmission rate is undoubtedly corresponding to a more high-order modulation mode, which inevitably occupies more system resources and consumes more power. In conclusion, the wireless AP in the existing technical solution has great power consumption; therefore, when a battery is used for power supply, the operating time of the wireless AP is short.

SUMMARY OF THE INVENTION

Embodiments of the present invention provide an operating method of a wireless Access Point device and the wireless Access Point device, to decrease the power consumption and prolong the operating time when a battery is used for power supply.

In order to achieve the above objectives, embodiments of the present invention adopt the following technical solutions.

An operating method of a wireless Access Point device includes:

in the absence of data connection, after transmitting N broadcast frame signals with full power, transmitting M broadcast frame signals with low power, where M is an integer greater than 0, N is an integer greater than 1 or N is an integer greater than 0, and a sum of M and N remains unchanged in a certain time span.

A wireless Access Point device includes:

a power selection unit, configured to transmit M broadcast frame signals with low power after transmitting N broadcast frame signals with full power in the absence of data connection, where M is an integer greater than 0, N is an integer greater than 1 or N is an integer greater than 0, and a sum of M and N remains unchanged in a certain time span.

The operating method of a wireless Access Point device and the wireless Access Point device according to the embodiments of the present invention are capable of transmitting M broadcast frame signals with low power after transmitting N broadcast frame signals with full power in the absence of data connection. In this manner, unlike the operating method of the wireless AP device and the wireless Access Point device in the prior art where a power amplifier remains in a working state all the time, in the operating method of a wireless Access Point device and the wireless Access Point device according to the embodiments of the present invention, a power amplifier works with time intervals, and after N broadcast frame signals are transmitted with full power, M broadcast frame signals are transmitted with low power. Therefore, the power consumption is decreased, and the operating time is prolonged when the battery is used for power supply.

An operating method of a wireless Access Point device includes:

in the presence of data connection, establishing a data connection with the lowest transmission rate in all compatible transmission rates; and judging whether a current transmission rate is greater than or equal to a sum of a current actual throughput and a preset system parameter; and if the current transmission rate is smaller than the sum of the current actual throughput and the preset system parameter, increasing the transmission rate; while if the current transmission rate is greater than or equal to the sum of the current actual throughput and the preset system parameter, maintaining the current transmission rate unchanged.

A wireless Access Point device includes:

a connection establishing unit, configured to establish a data connection with the lowest transmission rate in all compatible transmission rates in the presence of data connection;

a first judging unit, configured to judge whether a current transmission rate is greater than or equal to a sum of a current actual throughput and a preset system parameter; and a rate increasing unit, configured to increase the transmission rate if the current transmission rate is smaller than the sum of the current actual throughput and the preset system parameter.

Unlike the method and device in the prior art, the operating method of a wireless Access Point device and the wireless Access Point device according to the embodiments of the present invention establish the data connection with the lowest transmission rate in all compatible transmission rates, and start working. Then, real-time tracking and monitoring are performed to judge whether the current transmission rate is greater than or equal to the sum of the current actual throughput and the preset system parameter. If the current transmission rate is greater than the sum of the current actual throughput and the preset system parameter, it indicates that the current transmission rate can meet the use requirement of a user, and the transmission rate remains unchanged. On the contrary, if the current transmission rate is smaller than the sum of the current actual throughput and the preset system parameter, it indicates that the current transmission rate cannot meet the use requirement of the user, and the transmission rate needs to be increased. In this manner, it is avoided to transmit data with a high transmission rate as in most of the methods and devices in the prior art. Instead, data transmission is started with the lowest transmission rate, and then the transmission rate is changed at any time according to the actual throughput, thereby avoiding more use of a high-order modulation mode. As a result, the occupied system resources are reduced, the power consumption is decreased, and the operating time is prolonged when the battery is used for power supply.

BRIEF DESCRIPTION OF THE DRAWINGS

To illustrate the technical solutions according to the embodiments of the present invention or in the prior art more clearly, the accompanying drawings required for describing the embodiments or the prior art are introduced below briefly. Apparently, the accompanying drawings in the following description merely show some of the embodiments of the present invention, and persons of ordinary skill in the art can obtain other drawings according to the accompanying drawings without creative efforts.

DETAILED DESCRIPTION OF THE EMBODIMENTS

The technical solutions of the present invention will be clearly and comprehensively described in the following with reference to the accompanying drawings. It is obvious that the embodiments to be described are only a p art rather than all of the embodiments of the present invention. All other embodiments obtained by persons of ordinary skill in the art based on the embodiments of the present invention without creative efforts shall fall within the protection scope of the present invention.

Figure 1:
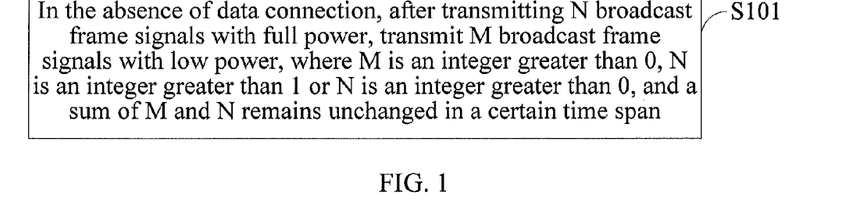
FIG. 1 is a block diagram of an operating method of a wireless Access Point device according to an embodiment of the present invention.

As shown in FIG. 1, an operating method of a wireless Access Point device provided in an embodiment of the present invention includes the following steps.

Step S101: In the absence of data connection, after transmitting N broadcast frame signals with full power, transmit M broadcast frame signals with low power, where M is an integer greater than 0, N is an integer greater than 1 or N is an integer greater than 0, and a sum of M and N remains unchanged in a certain time span.

In addition, the method further includes: detecting a Received Signal Strength Index (RSSI) of each station; and dynamically adjusting values of the parameters N and M according to the RSSI.

Figure 2:
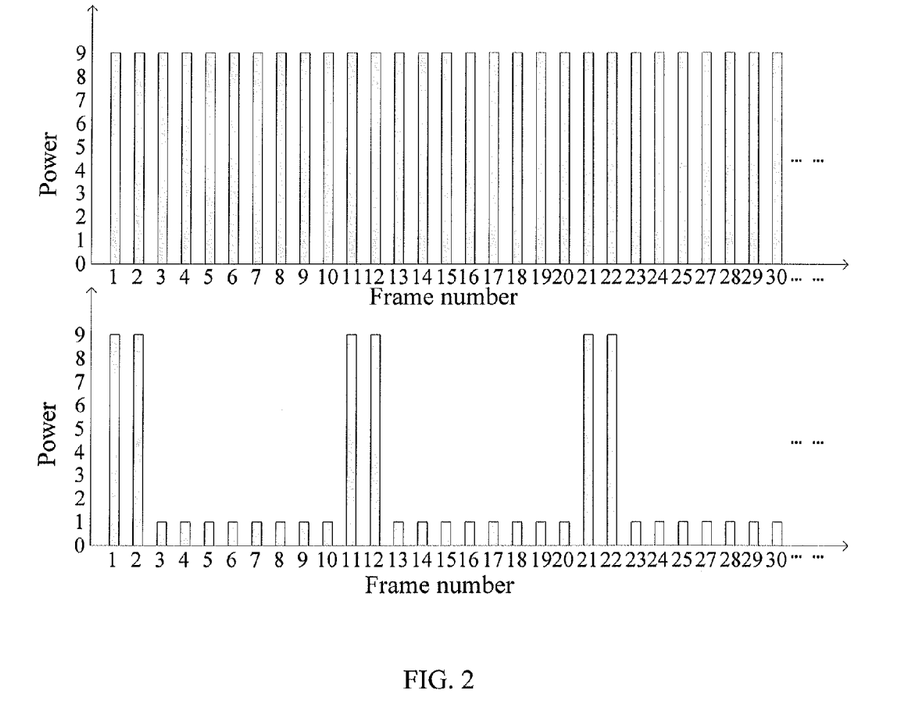
FIG. 2 is column charts of transmission power of an operating method of a wireless Access Point device in the prior art and according to an embodiment of the present invention.

Specifically, in selection of the parameters N and M, the RSSI of a received signal is detected, so as to judge a distance between connected station devices. Distribution of the stations is estimated through a statistical method, so as to perform dynamic adjustment. For example, the RSSI of each new station is decided according to a preset threshold X. If the number of stations which satisfy RSSI>X is continuously increased, M increases and N decreases; while if the number of stations which satisfy RSSI<X is continuously increased, N increases and M decreases. As shown in FIG. 2, the figure in an upper portion of FIG. 2 shows a transmission situation of an AP in the prior art, and the figure in a lower portion of FIG. 2 shows a transmission situation of this embodiment. That is, at a certain moment, two signals are transmitted with full power, and eight signals are transmitted with low power. With accessing of new stations, by judging the RSSI of the new stations, the operating method according to the embodiment of the present invention will change according to an actual situation, and also perform corresponding adjustment on full power transmission and low power transmission.

It can be clearly seen from this embodiment that, in the operating method of the wireless Access Point device according to the embodiment of the present invention, transmission power of the AP is different from that of the AP in the prior art. Therefore, the power consumption is decreased, and the operating time of a battery is prolonged.

Figure 3:
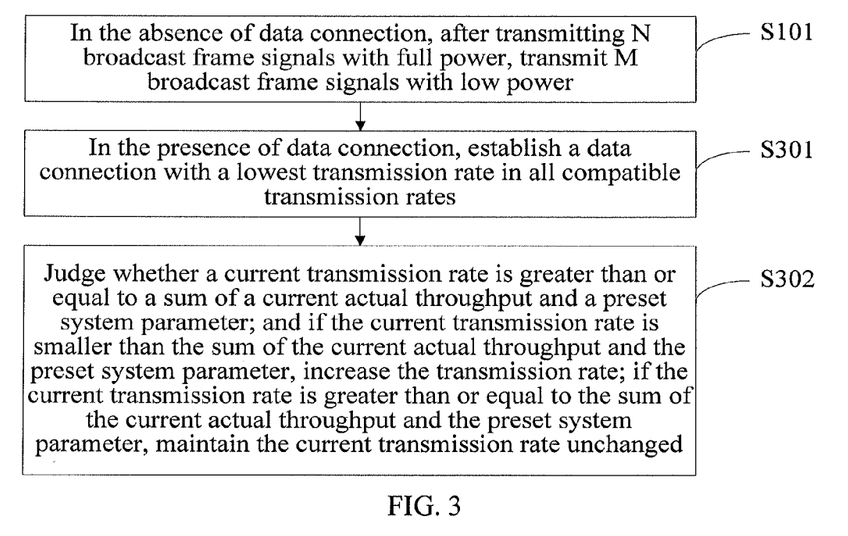
FIG. 3 is a flow block diagram of another operating method of a wireless Access Point device according to an embodiment of the present invention.

Further, as shown in FIG. 3, the operating method of the wireless AP device provided in the embodiment of the present invention further includes the following steps.

Step S301: In the presence of data connection, establish a data connection with the lowest transmission rate in all compatible transmission rates.

Step S302: Judge whether a current transmission rate is greater than or equal to a sum of a current actual throughput and a preset system parameter (here, the preset system parameter is used to indicate a data traffic added on the actual throughput); and if the current transmission rate is smaller than the sum of the current actual throughput and the preset system parameter, increase the transmission rate; while if the current transmission rate is greater than or equal to the sum of the current actual throughput and the preset system parameter, maintain the current transmission rate unchanged.

The data connection is established with the lowest transmission rate in all compatible transmission rates to start working. Then, real-time tracking and monitoring are performed to judge whether the current transmission rate is greater than or equal to the sum of the current actual throughput and the preset system parameter. If the current transmission rate is greater than the sum of the current actual throughput and the preset system parameter, it indicates that the current transmission rate can meet the use requirement of a user, and the transmission rate remains unchanged. On the contrary, if the current transmission rate is smaller than the sum of the current actual throughput and the preset system parameter, it indicates that the current transmission rate cannot meet the use requirement of the user, and the transmission rate needs to be increased. In this manner, it is avoided to transmit data with a high transmission rate as in most of the methods and devices in the prior art. Instead, data transmission is started with the lowest transmission rate, and then the transmission rate is changed at any time according to the actual throughput, thereby avoiding more use of a high-order modulation mode. As a result, the occupied system resources are reduced, the power consumption is decreased, and the operating time is prolonged when a battery is used for power supply.

Further, after the above judgment, it may also be judged whether the signal strength, a Signal-to-Noise Ratio, or the number of bad packets in transmission at the current transmission rate meets a normal operation requirement of the current transmission rate, and if failing to meet the normal operation requirement of the current transmission rate, the current transmission rate is decreased. The judgment is the same as the prior art, that is, the embodiment of the present invention is also compatible with the judging method in the prior art.

Figure 4:
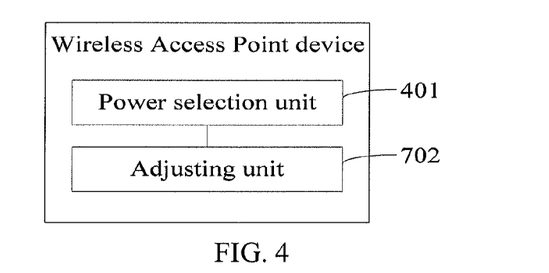
FIG. 4 is a schematic structure block diagram of a wireless Access Point device according to an embodiment of the present invention.

As shown in FIG. 4, a wireless Access Point device provided in an embodiment of the present invention includes:

A power selection unit 401, which is configured to transmit M broadcast frame signals with low power after N broadcast frame signals with full power are transmitted in the absence of data connection, where M is an integer greater than 0, N is an integer greater than 1 or N is an integer greater than 0, and a sum of M and N remains unchanged in a certain time span.

Further, the above wireless Access Point device further includes:

An adjusting unit 402, which is configured to detect an Received Signal Strength Index RSSI of each station, and dynamically adjust values of the parameters N and M according to the RSSI.

In this manner, unlike the wireless Access Point device and the operating method thereof in the prior art where a power amplifier remains in a working state, in the wireless Access Point device according to the embodiment of the present invention, a power amplifier works with time intervals, and after N broadcast frame signals are transmitted with full power, M broadcast frame signals are transmitted with low power. Therefore, the power consumption is decreased, and the operating time is prolonged when a battery is used for power supply.

Figure 5:
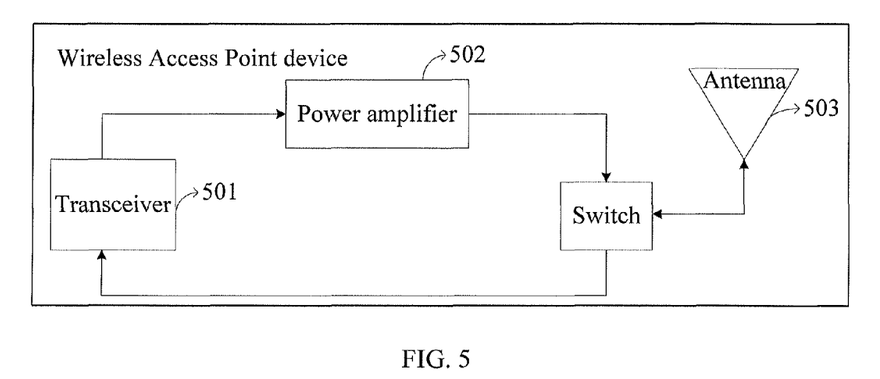
FIG. 5 is a schematic structure diagram of a wireless Access Point device in the prior art.

Specifically, in an actual application, an existing wireless AP is as shown in FIG. 5. In an idle state in the absence of data connection, a broadcast frame signal generated by a transceiver 501 is always amplified by a power amplifier 502, and then sent through an antenna 503.

Figure 6:
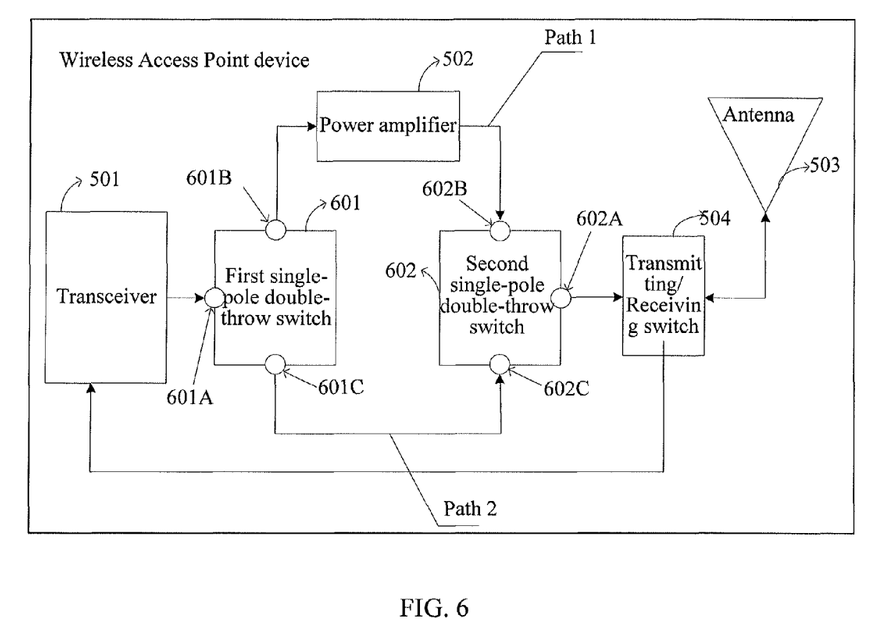
FIG. 6 is a schematic structure diagram of a wireless Access Point device according to an embodiment of the present invention.

In the wireless Access Point device according to the embodiment of the present invention, the power selection unit 401 may be two single-pole double-throw switches in an actual application. The specific is shown in FIG. 6.

A first single-pole double-throw switch 601 is disposed between the transceiver 501 and the power amplifier 502. A public end 601A of the first single-pole double-throw switch 601 is electrically connected to a signal output end of the transceiver 501, and a first selection end 601B of the first single-pole double-throw switch 601 is electrically connected to a signal input end of the power amplifier 502.

A second single-pole double-throw switch 602 is disposed between the power amplifier 502 and the antenna 503. A first selection end 602B of the second single-pole double-throw switch 602 is electrically connected to a signal output end of the power amplifier 502, and a public end 602A of the second single-pole double-throw switch 602 is electrically connected to the antenna 503 through a switch 504.

A second selection end 601C of the first single-pole double-throw switch 601 is electrically connected to a second selection end 602C of the second single-pole double-throw switch 602.

In this way, through the two added single-pole double-throw switches, two paths are formed between the transceiver 501 and the antenna 503, namely, the path 1 starts from the signal output end of the transceiver 501, passes through the public end 601A of the first single-pole double-throw switch 601, then passes through the first selection end 601B of the first single-pole double-throw switch 601 to reach the signal input end of the power amplifier 502, passes through the power amplifier 502 and exits from the signal output end of the power amplifier 502, passes through the first selection end 602B of the second single-pole double-throw switch 602, then passes through the public end 602A of the second single-pole double-throw switch 602, and reaches the antenna 503 through the switch 504. and the path 2 starts from the signal output end of the transceiver 501, passes through the public end 601A of the first single-pole double-throw switch 601, then passes through the second selection end 601C of the first single-pole double-throw switch 601 to reach the second selection end 602C of the second single-pole double-throw switch 602, then passes through the public end 602A of the second single-pole double-throw switch 602, and reaches the antenna 503 through the switch 504.

It can be seen from FIG. 6 that, the path 1 passes through the power amplifier 502, while the path 2 does not pass through the power amplifier 502. Therefore, the broadcast frame signal generated by the transceiver 501 may either be sent from the path 1 or sent from the path 2. Here, great power transmission implemented by using the path 1 is referred to as the full power transmission, and transmission implemented by using the path 2 is referred to as the low power transmission.

Further, the above wireless Access Point device may further include a control unit (not shown) electrically connected to the public end 601A of the first single-pole double-throw switch 601 and the public end 602A of the second single-pole double-throw switch 602. The control unit controls the public end 601A of the first single-pole double-throw switch 601 and the public end 602A of the second single-pole double-throw switch 602 to simultaneously switch on the first selection end 601B and 602B, respectively, or simultaneously switch on the second selection end 601C and 602C, respectively. That is, the control unit may control whether the broadcast frame signal generated by the transceiver 501 is transmitted through the path 1 or the path 2.

Specifically, after the control unit controls the public end 601A and 602A of the first single-pole double-throw switch 601 and the second single-pole double-throw switch 602 to simultaneously switch on the first selection end 601B and 602B of the first single-pole double-throw switch 601 and the second single-pole double-throw switch 602 respectively to transmit N broadcast frame signals, the control unit controls the public end 601A and 602A of the first single-pole double-throw switch 601 and the second single-pole double-throw switch 602 to simultaneously switch on the second selection end 601C and 602C of the first single-pole double-throw switch 601 and the second single-pole double-throw switch 602 respectively to transmit M broadcast frame signals, where M is an integer greater than 0, N is an integer greater than 1 or N is an integer greater than 0, and the sum of M and N remains unchanged in a certain time span.

In this manner, in the absence of data connection, the wireless Access Point device can adjust the transmission power of the broadcast frame signals according to a certain interval ratio, and transmit M broadcast frame signals with low power after N broadcast frame signals are transmitted with full power. Therefore, the power consumption of the wireless Access Point may be greatly decreased, and the operating time of a battery is prolonged. In such a transmission mode, the reserved N broadcast frame signals with full power may ensure that a station device at a farthest end can correctly receive the signals, successfully demodulate related Access Point information, and successfully initiate a connection request to the wireless Access Point device to establish a connection.

In a wireless Access Point device according to another embodiment of the present invention, the power selection unit 401 may be one single-pole double-throw switch in an actual application. For example, only the first single-pole double-throw switch 601 in FIG. 6 is reserved, where the public end 601A of the first single-pole double-throw switch 601 is electrically connected to the signal output end of the transceiver 501, the first selection end 601B of the first single-pole double-throw switch 601 is electrically connected to the signal input end of the power amplifier 502, and the second selection end 601C of the first single-pole double-throw switch 601 is directly electrically connected to a Transmitting/receiving switch 504 and the signal output end of the power amplifier 502, referring to the FIG. 7. Alternatively, only the second single-pole double-throw switch 602 in FIG. 6 is reserved, where the public end 602A of the second single-pole double-throw switch 602 is electrically connected to the Transmitting/receiving switch 504, the first selection end 602B of the second single-pole double-throw switch 602 is electrically connected to the signal output end of the power amplifier 502, and the second selection end 602C of the second single-pole double-throw switch 602 is directly electrically connected to the transceiver 501 and the signal input end of the power amplifier 502. The specific is as shown in FIG. 7.

A single-pole double-throw switch 701 is disposed between the transceiver 501 and the power amplifier 502. A public end 701A of the single-pole double-throw switch 701 is electrically connected to the signal output end of the transceiver 501, a first selection end 701B of the single-pole double-throw switch 701 is electrically connected to the signal input end of the power amplifier 502, and a second selection end 701C of the single-pole double-throw switch 701 is electrically connected to a Transmitting/receiving switch 505.

In this manner, by adding the single-pole double-throw switch, two paths are formed between the transceiver 501 and the antenna 503, namely, the path 1 starts from the signal output end of the transceiver 501, passes through the public end 701A of the single-pole double-throw switch 701, then passes through the first selection end 701B of the single-pole double-throw switch 701 to reach the signal input end of the power amplifier 502, and passes through the power amplifier 502 and exits from the signal output end of the power amplifier 502 to reach the antenna 503, and the path 2 starts from the signal output end of the transceiver 501, passes through the public end 701A of the single-pole double-throw switch 701, then passes through the second selection end 701C of the single-pole double-throw switch 701, and reaches the antenna 503 through the switch 505.

Figure 7:
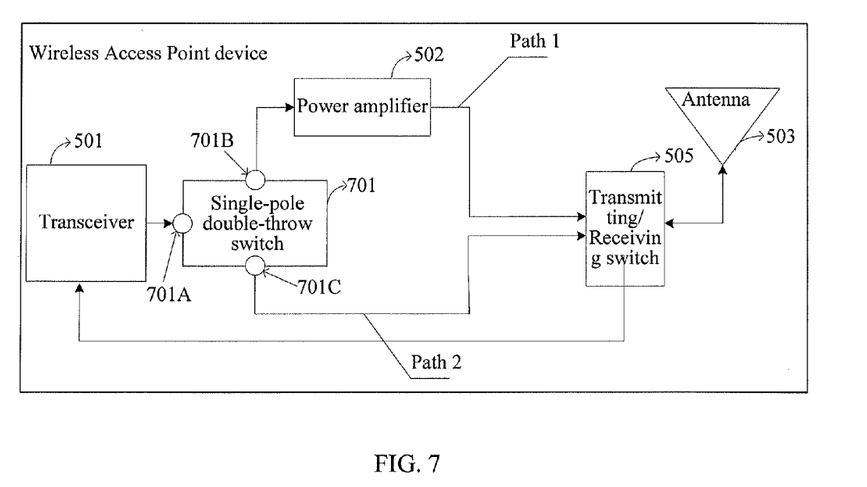
FIG. 7 is a schematic structure diagram of another wireless Access Point device according to an embodiment of the present invention.

It can be seen from FIG. 7 that, the path 1 passes through the power amplifier 502, while the path 2 does not pass through the power amplifier 502. Therefore, the broadcast frame signal generated by the transceiver 501 may either be sent from the path 1 or sent from the path 2. Here, great power transmission implemented by using the path 1 is referred to as the full power transmission, and transmission implemented by using the path 2 is referred to as the low power transmission.

Further, the above wireless Access Point device may further include a control unit electrically connected to the single-pole double-throw switch 701. The control unit controls the public end 701A of the single-pole double-throw switch 701 to switch on the first selection end 701B or switch on the second selection end 701C. That is, the control unit may control whether the broadcast frame signal generated by the transceiver 501 is transmitted through the path 1 or transmitted through the path 2.

Specifically, after the control unit controls the public end 701A of the single-pole double-throw switch 701 to switch on the first selection end 701B to transmit N broadcast frame signals, the control unit controls the public end 701A of the single-pole double-throw switch 701 to switch on the second selection end 701C to transmit M broadcast frame signals, where M is an integer greater than 0, N is an integer greater than 1 or N is an integer greater than 0, and a sum of M and N remains unchanged in a certain time span.

In this manner, in the absence of data connection, the wireless Access Point device can adjust the transmission power of the broadcast frame signals according to a certain interval ratio, and transmit M broadcast frame signals with low power after N broadcast frame signals are transmitted with full power. Therefore, the power consumption of the wireless AP may be greatly decreased, and the operating time of a battery is prolonged. In such a transmission mode, the reserved N broadcast frame signals with full power may ensure that a station device at a farthest end can correctly receive the signals, successfully demodulate related AP information, and successfully initiate a connection request to the wireless Access Point device to establish a connection.

It should be noted that, in this embodiment, one or two single-pole double-throw switches serving as the power selection unit 401 is merely an example for illustration, and the embodiment of the present invention is not limited thereto. Other devices may also be used as the power selection unit 401, which shall fall within the protection scope of the present invention as long as the functions of the devices are the same.

Figure 8:
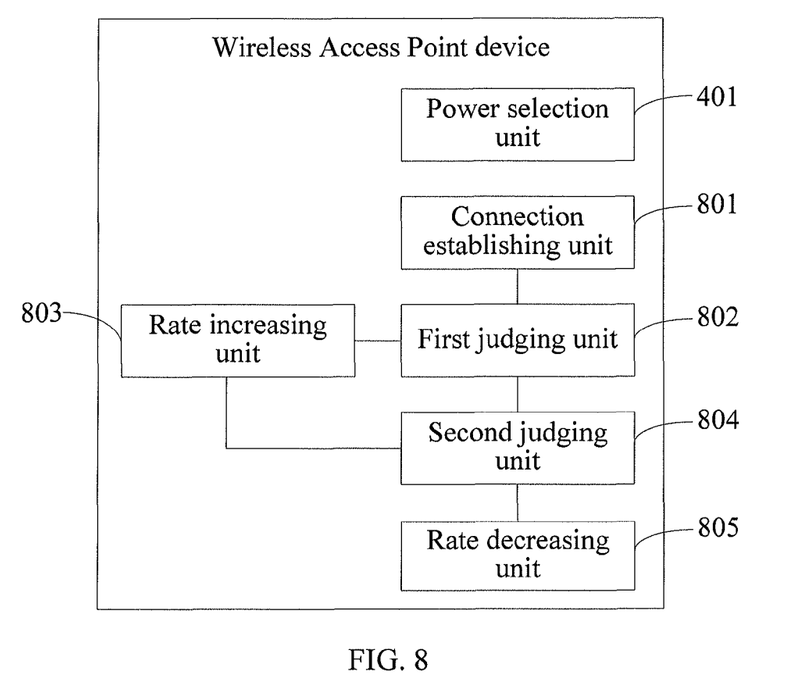
FIG. 8 is a structure block diagram of a wireless Access Point device according to an embodiment of the present invention.

Furthermore, in still another embodiment of the present invention, as shown in FIG. 8, the wireless Access Point device further includes:

A connection establishing unit 801, which is configured to establish a data connection with the lowest transmission rate in all compatible transmission rates in the presence of data connection.

A first judging unit 802, which is configured to judge whether a current transmission rate is greater than or equal to a sum of a current actual throughput and a preset system parameter.

A rate increasing unit 803, which is configured to increase the transmission rate if the current transmission rate is smaller than the sum of the current actual throughput and the preset system parameter.

In this manner, it is avoided to transmit data with a high transmission rate as in most of the methods and devices in the prior art. Instead, data transmission is started with the lowest transmission rate, and then the transmission rate is changed at any time according to the actual throughput, thereby avoiding more use of a high-order modulation mode. As a result, the occupied system resources are reduced, the power consumption is decreased, and the operating time is prolonged when a battery is used for power supply.

In addition, the wireless Access Point device further includes:

A second judging unit 804, which is configured to judge whether signal strength, an Signal-to-Noise Ratio, or the number of bad packets in transmission at the current transmission rate meets a normal operation requirement of the current transmission rate.

A rate decreasing unit 805, which is configured to decrease the current transmission rate if the signal strength, the Signal-to-Noise Ratio, or the number of the bad packets in transmission at the current transmission rate fails to meet the normal operation requirement of the current transmission rate.

It is judged whether the signal strength, the Signal-to-Noise Ratio, or the number of the bad packets in transmission at the current transmission rate meets the normal operation requirement of the current transmission rate, and if the signal strength, the Signal-to-Noise Ratio, or the number of the bad packets in transmission at the current transmission rate fails to meet the normal operation requirement of the current transmission rate, the current transmission rate is decreased. The judgment is the same as the prior art, that is, the embodiment of the present invention is also compatible with the judging method in the prior art.

Figure 9:
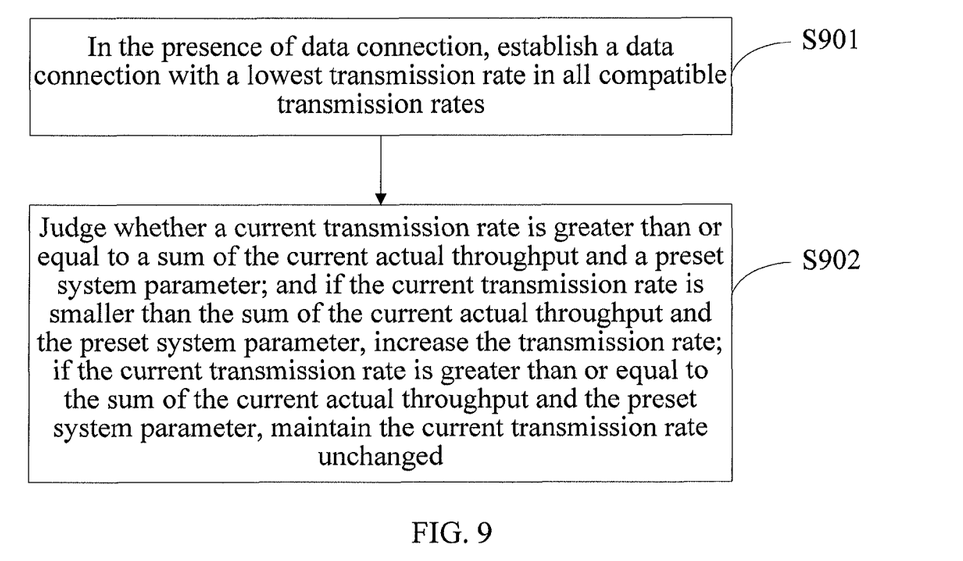
FIG. 9 is flow block diagram of an operating method of a wireless Access Point device according to an embodiment of the present invention.

As shown in FIG. 9, an operating method of a wireless Access Point device provided in an embodiment of the present invention includes the following steps.

Step S901: In the presence of data connection, establish a data connection with the lowest transmission rate in all compatible transmission rates.

Step S902: Judge whether a current transmission rate is greater than or equal to a sum of a current actual throughput and a preset system parameter; and if the current transmission rate is smaller than the sum of the current actual throughput and the preset system parameter, increase the transmission rate; while if the current transmission rate is greater than or equal to the sum of the current actual throughput and the preset system parameter, maintain the current transmission rate unchanged.

The data connection is established with the lowest transmission rate in all compatible transmission rates to start working. Then, real-time tracking and monitoring are performed to judge whether the current transmission rate is greater than or equal to the sum of the current actual throughput and the preset system parameter. If the current transmission rate is greater than the sum of the current actual throughput and the preset system parameter, it indicates that the current transmission rate can meet the use requirement of a user, and the transmission rate remains unchanged. On the contrary, if the current transmission rate is smaller than the sum of the current actual throughput and the preset system parameter, it indicates that the current transmission rate cannot meet the use requirement of the user, and the transmission rate needs to be increased.

Figure 10:
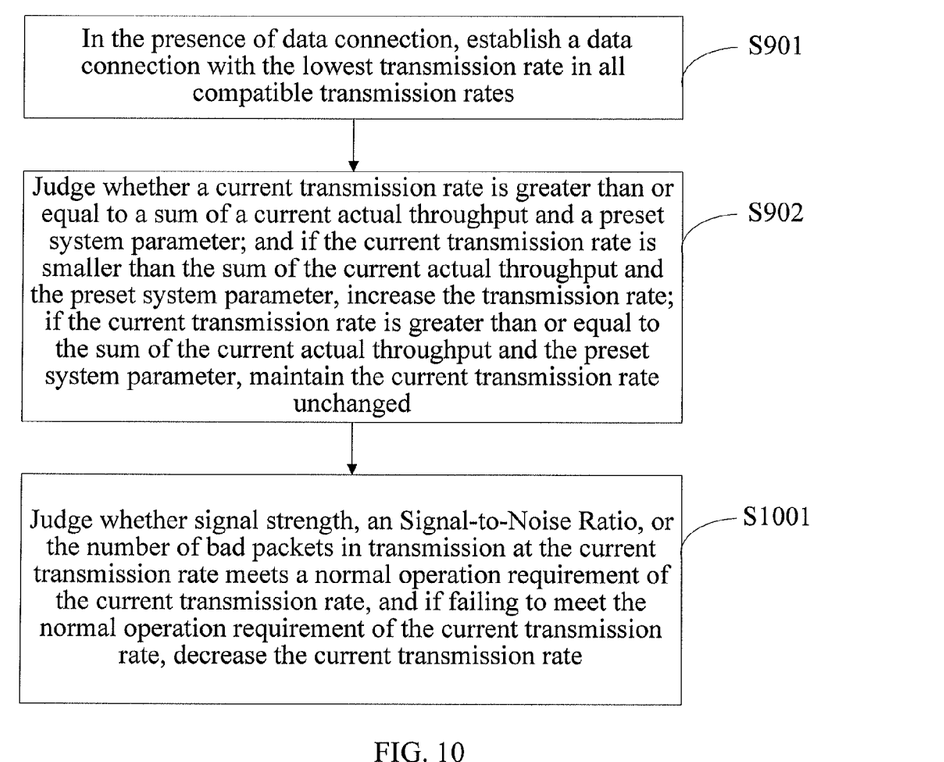
FIG. 10 is a flow block diagram of another operating method of a wireless Access Point device according to an embodiment of the present invention.

Further, after the above judgment, as shown in FIG. 10, the method further includes the following steps.

Step 1001: Judge whether signal strength, an Signal-to-Noise Ratio, or the number of bad packets in transmission at the current transmission rate meets a normal operation requirement of the current transmission rate, and if the signal strength, the Signal-to-Noise Ratio, or the number of the bad packets in transmission at the current transmission rate fails to meet the normal operation requirement of the current transmission rate, decrease the current transmission rate.

In this manner, it is avoided to transmit data with a high transmission rate as in most of the methods and devices in the prior art. Instead, data transmission is started with the lowest transmission rate, and then the transmission rate is changed at any time according to the actual throughput, thereby avoiding more use of a high-order modulation mode. As a result, the occupied system resources are reduced, the power consumption is decreased, and the operating time is prolonged when a battery is used for power supply.

Figure 11:
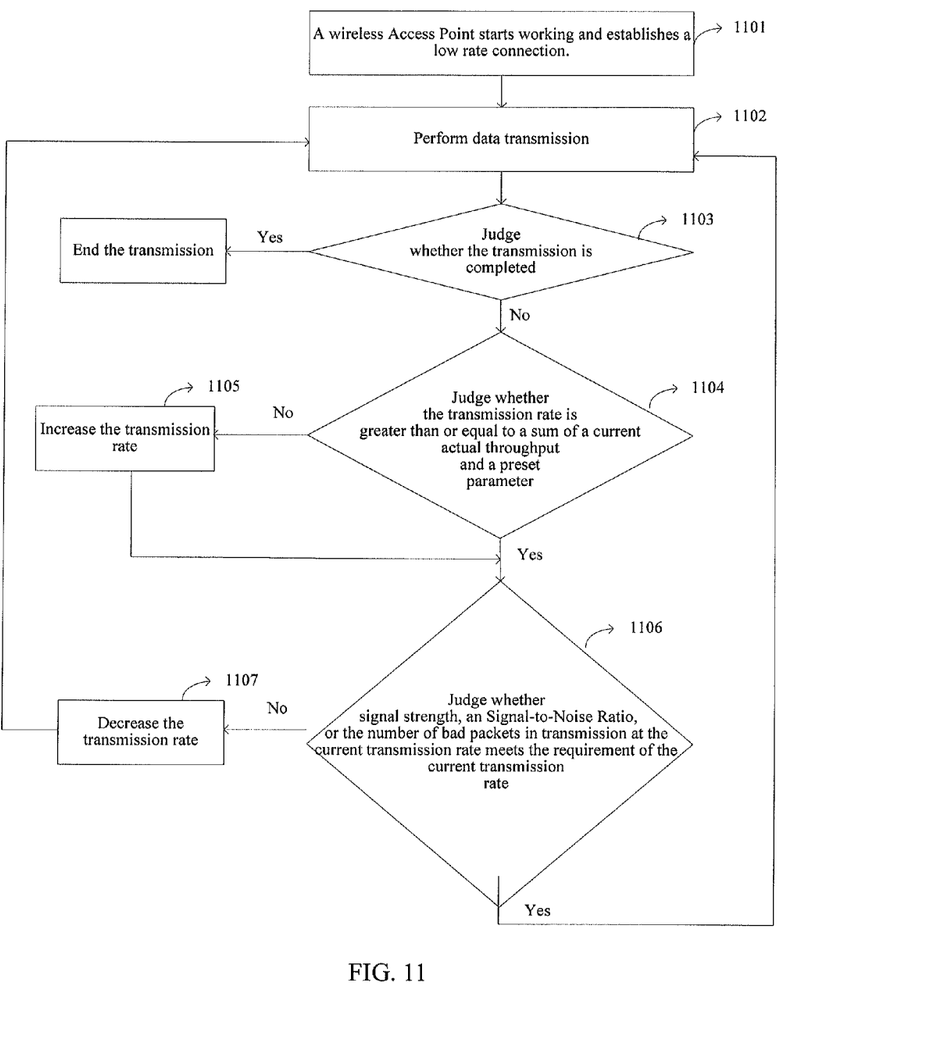
FIG. 11 is a block diagram of further another operating method of a wireless Access Point device according to an embodiment of the present invention.

Specifically, as shown in FIG. 11, an operating method of a wireless Access Point device provided in another embodiment of the present invention includes the following steps.

Step 1101: A wireless Access Point device, which may be a wireless AP in this embodiment, establishes a data connection with the lowest transmission rate in all compatible transmission rates.

Step 1102: The wireless AP performs data transmission with a current transmission rate.

Step 1103: Judge whether a data transmission process is completed, and if the data transmission process is completed, end the data transmission.

Step 1104: When the data transmission is not completed, judge whether the current transmission rate is greater than or equal to a sum of a current actual throughput and a preset system parameter.

Step 1105: If a judgment result is that the current transmission rate is smaller than the sum of the current actual throughput and the preset system parameter, that is, the current transmission rate cannot meet the requirement of a user, increase the data transmission rate.

Step 1106: If it is determined in step 1104 that the current transmission rate is greater than or equal to the sum of the current actual throughput and the preset system parameter, that is, the current transmission rate can meet the requirement of the user, judge whether signal strength, an SNR, or the number of bad packets in transmission at the current transmission rate meets the requirement of the current transmission rate; and if the signal strength, the SNR, or the number of the bad packets in transmission at the current transmission rate meets the requirement of the current transmission rate, continue the transmission with the transmission rate.

Alternatively, if it is determined in step 1104 that the current transmission rate is smaller than the sum of the current actual throughput and the preset system parameter, that is, the current transmission rate cannot meet the requirement of the user, judge whether signal strength, an SNR, or the number of bad packets in transmission at the transmission rate increased in step 1105 meets a requirement of the current transmission rate; and if the signal strength, the SNR, or the number of the bad packets in transmission at the transmission rate increased in step 1105 meets the requirement of the current transmission rate, continue the transmission with the transmission rate.

Step 1107: If it is judged in step 1106 that the signal strength, the SNR, or the number of the bad packets in transmission at the current transmission rate fails to meet the requirement of the current transmission rate, decrease the current transmission rate, and perform the transmission with the decreased rate.

The operating method of the wireless AP of this embodiment is not only compatible with the judgment method in the prior art, but also establishes the data connection with the lowest transmission rate in all compatible transmission rates to start working. Then, real-time tracking and monitoring are performed to judge whether the current transmission rate is greater than or equal to the sum of the current actual throughput and the preset system parameter. If the current transmission rate is greater than the sum of the current actual throughput and the preset system parameter, it indicates that the current transmission rate can meet the use requirement of a user, and the transmission rate remains unchanged. On the contrary, if the current transmission rate is smaller than the sum of the current actual throughput and the preset system parameter, it indicates that the current transmission rate cannot meet the use requirement of the user, and the transmission rate needs to be increased. In this manner, it is avoided to transmit data with a high transmission rate as in most of the methods and devices in the prior art. Instead, data transmission is started with the lowest transmission rate, and then the transmission rate is changed at any time according to the actual throughput, thereby avoiding more use of a high-order modulation mode. As a result, the occupied system resources are reduced, the power consumption is decreased, and the operating time is prolonged when a battery is used for power supply.

Figure 12:
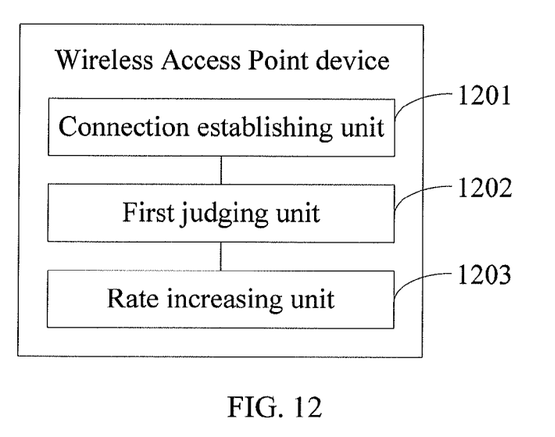
FIG. 12 is a structure block diagram of a wireless Access Point device according to an embodiment of the present invention.

As shown in FIG. 12, a wireless Access Point device provided in an embodiment of the present invention includes:

A connection establishing unit 1201, which is configured to establish a data connection with the lowest transmission rate in all compatible transmission rates in the presence of data connection.

A first judging unit 1202, which is configured to judge whether a current transmission rate is greater than or equal to a sum of a current actual throughput and a preset system parameter.

A rate increasing unit 1203, which is configured to increase the transmission rate if the current transmission rate is smaller than the sum of the current actual throughput and the preset system parameter.

In this manner, it is avoided to transmit data with a high transmission rate as in most of the methods and devices in the prior art. Instead, data transmission is started with the lowest transmission rate, and then the transmission rate is changed at any time according to the actual throughput, thereby avoiding more use of a high-order modulation mode. As a result, the occupied system resources are reduced, the power consumption is decreased, and the operating time is prolonged when a battery is used for power supply.

Figure 13:
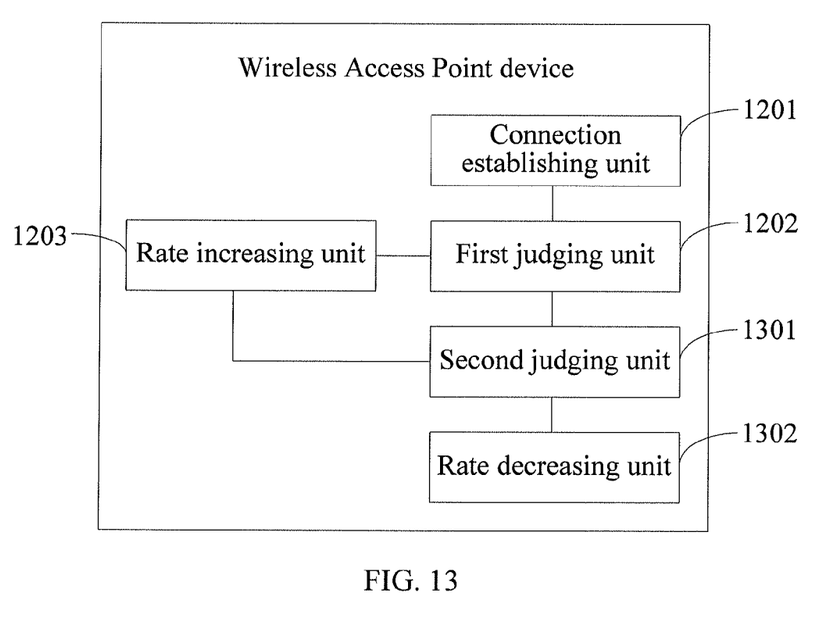
FIG. 13 is a structure block diagram of another wireless Access Point device according to an embodiment of the present invention.

In addition, as shown in FIG. 13, a wireless Access Point device provided in another embodiment of the present invention further includes:

A second judging unit 1301, which is configured to judge whether signal strength, an Signal-to-Noise Ratio, or the number of bad packets in transmission at the current transmission rate meets a normal operation requirement of the current transmission rate.

A rate decreasing unit 1302, which is configured to decrease the current transmission rate if the signal strength, the Signal-to-Noise Ratio, or the number of the bad packets in transmission at the current transmission rate fails to meet the normal operation requirement of the current transmission rate.

It is judged whether the signal strength, the Signal-to-Noise Ratio, or the number of the bad packets in transmission at the current transmission rate meets the normal operation requirement of the current transmission rate, and if failing to meet the normal operation requirement of the current transmission rate, the current transmission rate is decreased. The judgment is the same as the prior art, that is, the embodiment of the present invention is also compatible with the judgment in the prior art.

The above is only the specific implementation of the present invention, but the protection scope of the present invention is not limited herein. Any change or replacement that can be easily figured out by persons skilled in the art within the technical scope disclosed by the present invention shall be covered by the protection scope of the present invention. Therefore, the protection scope of the present invention shall be the protection scope of the claims.

What is claimed is:

1. An operating method of a wireless Access Point device, comprising:
   in the absence of data connection, after transmitting N broadcast frame signals with full power, transmitting by the wireless Access Point device, M broadcast frame signals with low power when a battery is used for power supply to the wireless Access Point device,
   wherein the transmitting with full power comprising amplification of the N broadcast frame signals between a transceiver and an antenna in the wireless Access Point device, and the transmitting in low power comprising by-passing amplification to the M broadcast frame signals between the transceiver and the antenna in the wireless Access Point device,
   wherein M is an integer greater than 0, N is an integer greater than 1 or N is an integer greater than 0, and a sum of M and N remains unchanged in a certain time span;
   wherein in the presence of data connection:
   establishing a data connection with the lowest transmission rate in all compatible transmission rates; and
   judging whether a current transmission rate is greater than or equal to a sum of a current actual throughput and a preset system parameter; and if the current transmission rate is smaller than the sum of the current actual throughput and the preset system parameter, increasing the transmission rate; if the current transmission rate is greater than or equal to the sum of the current actual throughput and the preset system parameter, maintaining the current transmission rate unchanged.

2. The operating method of the wireless Access Point device according to claim 1, wherein after the judging whether the current transmission rate is greater than or equal to the sum of the current actual throughput and the preset system parameter; and if the current transmission rate is smaller than the sum of the current actual throughput and the preset system parameter, increasing the transmission rate; if the current transmission rate is greater than or equal to the sum of the current actual throughput and the preset system parameter, maintaining the current transmission rate unchanged, further comprises:

judging whether signal strength, a Signal-to-Noise Ratio, or the number of bad packets in transmission at the current transmission rate meets a normal operation requirement of the current transmission rate, and if failing to meet the normal operation requirement of the current transmission rate, decreasing the current transmission rate.

3. An operating method of a wireless Access Point device, comprising:
  in the presence of data connection, establishing by the wireless Access Point device, a data connection with the lowest transmission rate in all compatible transmission rates when a battery is used for power supply to the wireless Access Point device; and
  judging by the wireless Access Point device, whether a current transmission rate is greater than or equal to a sum of a current actual throughput and a preset system parameter; and if the current transmission rate is smaller than the sum of the current actual throughput and the preset system parameter, increasing the transmission rate; if the current transmission rate is greater than or equal to the sum of the current actual throughput and the preset system parameter, maintaining the current transmission rate unchanged,
  in the absence of data connection, after transmitting N broadcast frame signals with full power, transmitting by the wireless Access Point device, M broadcast frame signals with low power when a battery is used for power supply to the wireless Access Point device,
  wherein the transmitting with full power comprising amplification of the N broadcast frame signals between a transceiver and an antenna in the wireless Access Point device, and the transmitting in low power comprising by-passing amplification to the M broadcast frame signals between the transceiver and the antenna in the wireless Access Point device, wherein M is an integer greater than 0, N is an integer greater than 1 or N is an integer greater than 0, and a sum of M and N remains unchanged in a certain time span.

4. The operating method of the wireless Access Point device according to claim 3, wherein after the judging whether the current transmission rate is greater than or equal to the sum of the current actual throughput and the preset system parameter; and if the current transmission rate is smaller than the sum of the current actual throughput and the preset system parameter, increasing the transmission rate; while if the current transmission rate is greater than or equal to the sum of the current actual throughput and the preset system parameter, maintaining the current transmission rate unchanged, further comprises: judging whether signal strength, a Signal-to-Noise Ratio, or the number of bad packets in transmission at the current transmission rate meets a normal operation requirement of the current transmission rate, and if failing to meet the normal operation requirement of the current transmission rate, decreasing the current transmission rate.

5. A wireless Access Point device, comprising:
  a power selection unit, configured to transmit M broadcast frame signals with low power after transmitting N broadcast frame signals with full power in the absence of data connection when a battery is used for power supply to the wireless Access Point device,
    wherein the transmitting with full power comprising amplification of the N broadcast frame signals between a transceiver and an antenna in the wireless Access Point device, and the transmitting in low power comprising by-passing amplification to the M broadcast frame signals between the transceiver and the antenna in the wireless Access Point device,
    wherein M is an integer greater than 0, N is an integer greater than 1 or N is an integer greater than 0, and a sum of M and N remains unchanged in a certain time span;
  a connection establishing unit, configured to establish a data connection with the lowest transmission rate in all compatible transmission rates in the presence of data;
  a first judging unit, configured to judge whether a current transmission rate is greater than or equal to a sum of a current actual throughput and a preset system parameter; and
  a rate increasing unit, configured to increase the transmission rate if the current transmission rate is smaller than the sum of the current actual throughput and the preset system parameter.

6. The wireless Access Point device according to claim 5, further comprising:
  a second judging unit, configured to judge whether signal strength, a Signal-to-Noise Ratio, or the number of bad packets in transmission at the current transmission rate meets a normal operation requirement of the current transmission rate; and
  a rate decreasing unit, configured to decrease the current transmission rate if the signal strength, the Signal-to-Noise Ratio, or the number of the bad packets in transmission at the current transmission rate fails to meet the normal operation requirement of the current transmission rate.

* * * * *